June 29, 1965   H. REIFEL   3,192,450
ELECTROMAGNETIC SWITCHES OF THE MAKE-BEFORE-BREAK TYPE
Filed Aug. 1, 1962

Inventor:
Harry Reifel,
by Robert J. Palmer
Attorney

United States Patent Office 3,192,450
Patented June 29, 1965

3,192,450
ELECTROMAGNETIC SWITCHES OF THE MAKE-BEFORE-BREAK TYPE
Harry Reifel, Waltham, Mass., assignor to Stevens-Arnold Inc., South Boston, Mass., a corporation of Massachusetts
Filed Aug. 1, 1962, Ser. No. 213,995
4 Claims. (Cl. 317—155.5)

This invention relates to electromagnetic switches of the make-before-break type, and has an object to reduce the contact wear of such switches.

A make-before-break type of relay or chopper usually has a reed which in its mid-position engages a contact with each of its opposite sides. When the reed is deflected by A.C. flowing through an associated coil, it moves during one half-wave away from one contact, and moves during the opposite half-wave away from the other contact. Usually there is about a 5% overlap period during which the reed touches both contacts, the reed rubbing against both contacts during the overlap period.

This invention provides a make-before-break switch in which contact wear is reduced. In one embodiment of this invention, a pair of axially aligned reeds of magnetic spring metal are supported at their inner ends and have free outer ends. A pair of fixed contacts is provided, one normally touching the free end of each reed. An electromagnetic coil is provided for each reed to deflect the free end of the reed from its fixed contact when the coil is energized. The coils are connected through oppositely poled diodes to an A.C. source so that during one half-wave, one of the reeds is deflectd away from its fixed contact, and during the opposite half-wave, the other reed is deflected away from its fixed contact. During the time required for the current in one coil to rise from zero value to reed deflecting value and for the current in the other coil to decrease from reed deflection value to zero value, the reeds remain in contact with both contacts so that there is overlap without the previous simultaneous rubbing of contacts on opposite sides of a reed.

Figure 1:
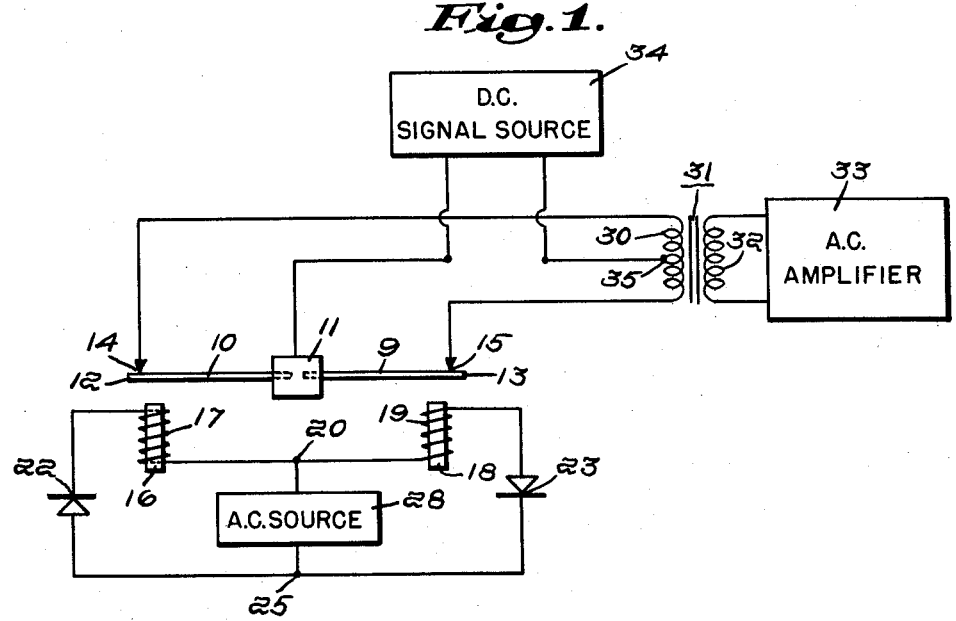
Figure 2:
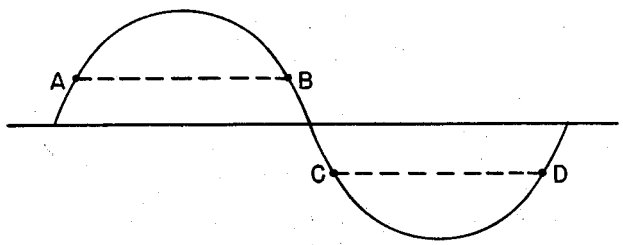

This invention will now be described with reference to the annexed drawings, of which:

FIG. 1 is a diagrammatic view of a chopper embodying this invention, connecting a source of weak D.C. to be amplified to an A.C. amplifier, and connected to an A.C. reed deflecting source, and FIG. 2 is a sine-wave of the A.C. supplied through diodes to the coils of FIG. 1, and shows the points on the curve where the contacts touch and leave the reeds.

Reeds 9 and 10 of magnetic spring metal are supported at their inner ends in a fixed metal block 11, and have free ends 13 and 12 respectively, normally in contact with fixed contacts 15 and 14 respectively. Under the reed 10 near its free end is pole piece 17 of electromagnet 17. Under the reed 9 is a pole piece 18 of electromagnet 19. The lower ends of the electromagnets 17 and 19 are connected together and to a terminal 20, and their upper ends are connected together through oppositely poled diodes 22 and 23, and to terminal 25 at the junction of the diodes. An A.C. source 28 which may be a 400 c.p.s. source, is connected to the terminals 20 and 25.

The contact 14 is connected to one end of primary winding 30 of input transformer 31 which has a secondary winding 32 connected to the input of A.C. amplifier 33. The contact 15 is connected to the opposite end of the winding 30. A source 34 of weak D.C. signals to be amplified is connected to center-tap 35 of the winding 30 and to the block 11.

*Operation*

In operation, during the positive half-waves of current from the source 28, the diode 22 conducts and passes current to energize the electromagnet 17. During such positive half-waves, the free end 12 of the reed 10 is attracted by the pole piece 16 of the electromagnet 17. The current rises from its zero value to the point A on the curve of FIG. 2 where the strength of the force of the electromagnet 17 is sufficient to overcome the stiffness of the reed 10, and to pull its free end away from the contact 14, opening the circuit connecting the D.C. signal source 34 to the upper half of the primary winding 30 of the transformer 31. The positive half-wave of current after passing its peak, decreases to point B on the curve of FIG. 2, where the force of the electromagnet 17 is insufficient to prevent the spring action of the reed 10 from returning it to its position against the contact 14, where it recloses the circuit connecting the D.C. source 34 to the upper half of the winding 30.

During the negative half-waves of current from the source 28, the diode 23 conducts and passes current to the electromagnet 19. During the negative half-waves, the free end 13 of the reed 9 is attracted by the pole piece 18 of the electromagnet 19. This current rises from its zero value to the point C on the curve of FIG. 2, where the strength of the electromagnet 19 is sufficient to overcome the stiffness of the reed 9 and to pull its free end 13 away from the contact 15, opening the circuit connecting the D.C. source 34 to the lower half of the transformer winding 30. The negative half-wave after passing its peak decreases to point D on the curve of FIG. 2 where the force of the electromagnet 19 is insufficient to prevent the spring action of the reed 9 from restoring it to its position against the contact 15, reclosing the circuit connecting the D.C. signal source 34 to the bottom half of the transformer winding 30.

The opening and closing of the contacts 14 and 15 interrupt the flow of D.C. from the source 34 through the primary winding 30 of the transformer 31, causing a conformal A.C. in the secondary winding 32 which can be amplified by the amplifier 33.

It will be noted that between the points B and C on the curve of FIG. 2, the contacts 14 and 15 are in contact with the reeds 10 and 9 respectively, providing the desired overlap. This overlap is provided without the rubbing of contacts on opposite sides of a reed

What is claimed is:

1. An electromagnetic switch comprising a first reed member of magnetic spring metal cantilever supported at one end, fixed contact means at one side of the free end of said member, said free end being normally in contact with said contact means, first electromagnetic means for deflecting said free end out of contact with said contact means, a second reed member of magnetic spring metal cantilever supported at one end, second fixed contact means at one side of the free end of said second member, said free end of said second member being normally in contact with said second contact means, second electromagnetic means for deflecting said free end of said second member out of contact with said second contact means, and means for supplying current pulses of one polarity only to said first electromagnetic means, and for supplying current pulses of the opposite polarity only and having the same frequency as said first mentioned pulses, to said second electromagnetic means.

2. An electromagnetic switch as claimed in claim 1 in which said means for supplying pulses comprises a source of A.C., means including a first diode having one polarity for connecting said source to said first electromagnetic means, and means including a second diode having the opposite polarity for connecting said source to said second electromagnetic means.

3. An electromagnetic switch as claimed in claim 2 in which said first electromagnetic means comprises a coil having a polepiece at the opposite side of said free end of said first member, and in which said second electromagnetic means comprises a coil having a polepiece at the side of said free end of said second member which is opposite the said side at which said second contact means is.

4. An electromagnetic switch as claimed in claim 3 in which common means is provided for cantilever supporting said first and second reed means.

References Cited by the Examiner

UNITED STATES PATENTS

| | | | |
|---|---|---|---|
| 2,324,964 | 7/43 | Thompson | 321—49 |
| 2,425,570 | 8/47 | Scheg et al. | 307—133 X |
| 2,752,491 | 6/56 | Ringoen | 307—133 X |
| 2,790,129 | 4/57 | Barnes | 200—90 X |
| 2,906,837 | 9/59 | Gimson | 200—90 |

SAMUEL BERNSTEIN, *Primary Examiner.*